(12) United States Patent
Cooper

(10) Patent No.: US 12,552,466 B2
(45) Date of Patent: Feb. 17, 2026

(54) HEIGHT ADJUSTABLE STORAGE RACK FOR A PICKUP TRUCK BED

(71) Applicant: Prentice C Cooper, Conroe, TX (US)

(72) Inventor: Prentice C Cooper, Conroe, TX (US)

( * ) Notice: Subject to any disclaimer, the term of this patent is extended or adjusted under 35 U.S.C. 154(b) by 0 days.

(21) Appl. No.: 19/237,317

(22) Filed: Jun. 13, 2025

(65) Prior Publication Data

US 2025/0382019 A1      Dec. 18, 2025

Related U.S. Application Data

(60) Provisional application No. 63/659,611, filed on Jun. 13, 2024.

(51) Int. Cl.
*B62D 33/02*      (2006.01)

(52) U.S. Cl.
CPC .............................. *B62D 33/0207* (2013.01)

(58) Field of Classification Search
CPC ........... B60R 9/00; B60R 11/06; B60R 5/041; B62D 33/023; B62D 33/0207; B62D 33/0273

See application file for complete search history.

(56) References Cited

U.S. PATENT DOCUMENTS

| | | | | |
|---|---|---|---|---|
| 5,303,969 | A | * | 4/1994 | Simnacher ................ B60R 9/00 224/543 |
| 11,370,495 | B2 | * | 6/2022 | Ramirez, Jr. ........... B60P 3/341 |
| 11,440,481 | B1 | * | 9/2022 | Cooper .............. B62D 33/0276 |
| 11,932,311 | B2 | * | 3/2024 | Salter .................. B62D 33/023 |

* cited by examiner

*Primary Examiner* — Corey N Skurdal
(74) *Attorney, Agent, or Firm* — Dale J. Ream

(57) ABSTRACT

A storage or transport rack apparatus for a pickup truck bed is adjustable between a deployed or raised configuration extending upwardly above the truck bed rails and a stowage or lowered configuration positioned at or below the level of the pickup truck bed rails. The storage or transport rack for a pickup truck bed may be raised or lowered using linear actuators hidden below the bottom wall of the truck bed.

3 Claims, 6 Drawing Sheets

HEIGHT ADJUSTABLE STORAGE RACK FOR A PICKUP TRUCK BED

REFERENCE TO RELATED APPLICATIONS

This application is a non-provisional patent application claims priority based on provisional patent application U.S. Ser. No. 63/659,611 titled Height Adjustable Storage Rack for a Pickup Truck Bed filed Jun. 13, 2024, and which is related to U.S. Pat. No. 11,440,481 titled Truckbox and Panel Lift Apparatus issued Sep. 13, 2022, both of which are incorporated herein in its entirety.

BACKGROUND OF THE INVENTION

This invention relates generally to storage and carrying devices and, more particularly, to a height adjustable storage rack for a pickup truck bed.

Common in the world of construction, maintenance, and outdoor activities in general, pickup trucks with the enhanced payload that a truck bed brings, are indispensable tools on and off the job. The versatility of pickup trucks is enhanced with the addition of a ladder rack which offers a convenient solution for transporting ladders, lumber, or other lengthy items. However, ladder racks traditionally extend upwardly above the rails of the pickup truck bed and may be deemed unsightly or in the way when not needed. Traditionally, ladder racks must be uninstalled and physically lifted out of a truck bed when not needed and then reinstalled or lifted back into the truck bed when needed. The undesirability of this routine cannot be overstated.

Therefore, it would be desirable to have a height-adjustable storage rack for a pickup truck bed that can be raised above the pickup truck bed rails when desired or lowered when not needed. Further, it would be desirable to have a height-adjustable storage rack for a pickup truck bed that provides the utility of transporting ladders or elongate boards when needed yet becomes invisible when not needed without requiring removal altogether. In addition, it would be desirable to have a height-adjustable storage rack for a pickup truck bed in which linear actuators that provide movement are hidden beneath the truck bed itself.

SUMMARY OF THE INVENTION

With further regard to the disadvantages of traditional ladder racks, traditional fixed ladder racks can be a hindrance when not in use, affecting the aerodynamics of the truck and limiting access to the bed. Further, the drag caused by permanently attached ladder racks can adversely impact fuel efficiency. Further still, fixed ladder racks may pose challenges when it comes to parking in low-clearance areas, such as garages or parking structures. In addition, loading and unloading lengthy items can be a cumbersome task with a fixed ladder rack as the items stored thereon may be at a height that is taller than the truck itself. By contrast, the ability to raise and lower the ladder rack as needed mitigates these disadvantages. For instance, the bed is left unobstructed when not carrying long items and this space optimization ensures practicality without compromising the trucks overall functionality. Further wind resistance is reduced and fuel efficiency is increased when the storage rack is lowered. Finally, safety is enhanced when the ladder rack can be lowered during normal driving, i.e., when the ladder rack is unnecessary.

In summary, therefore, the evolution of ladder racks that extend upwardly above the bed stake pockets are an attractive option when a pickup truck is used for both business and also for recreation. As the demand for multifunctional accessories grows, adjustable ladder racks stand out as a practical solution that showcases the ingenuity and adaptability that enhances the overall utility of a pickup truck.

Therefore, a general object of this invention is to provide a storage or transport rack for a pickup truck bed that is adjustable between a deployed or raised configuration extending upwardly above the truck bed rails and a stowage or lowered configuration positioned at or below the level of the pickup truck bed rails.

Another object of this invention is to provide a storage or transport rack for a pickup truck bed, as aforesaid, that can be raised or lowered using linear actuators hidden below the bottom wall of the truck bed.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is a side view of the retractable storage rack as in FIG. 1a;

FIG. 2b is a side view of the retractable storage rack as in FIG. 2a;

FIG. 4b is an isolated view on an enlarged scale taken from FIG. 4a;

FIG. 4c is an isolated view on an enlarged scale taken from FIG. 4a;

FIG. 4d is an isolated view on an enlarged scale taken from FIG. 4a;

FIG. 5a is a side view of the retractable storage rack as and FIG. 1a;

FIG. 5b is a sectional view taken along line 5b-5b of FIG. 5a;

FIG. 6b is an isolated view on an enlarged scale taken from FIG. 6a; and

DESCRIPTION OF THE PREFERRED EMBODIMENT

Figure 1A:
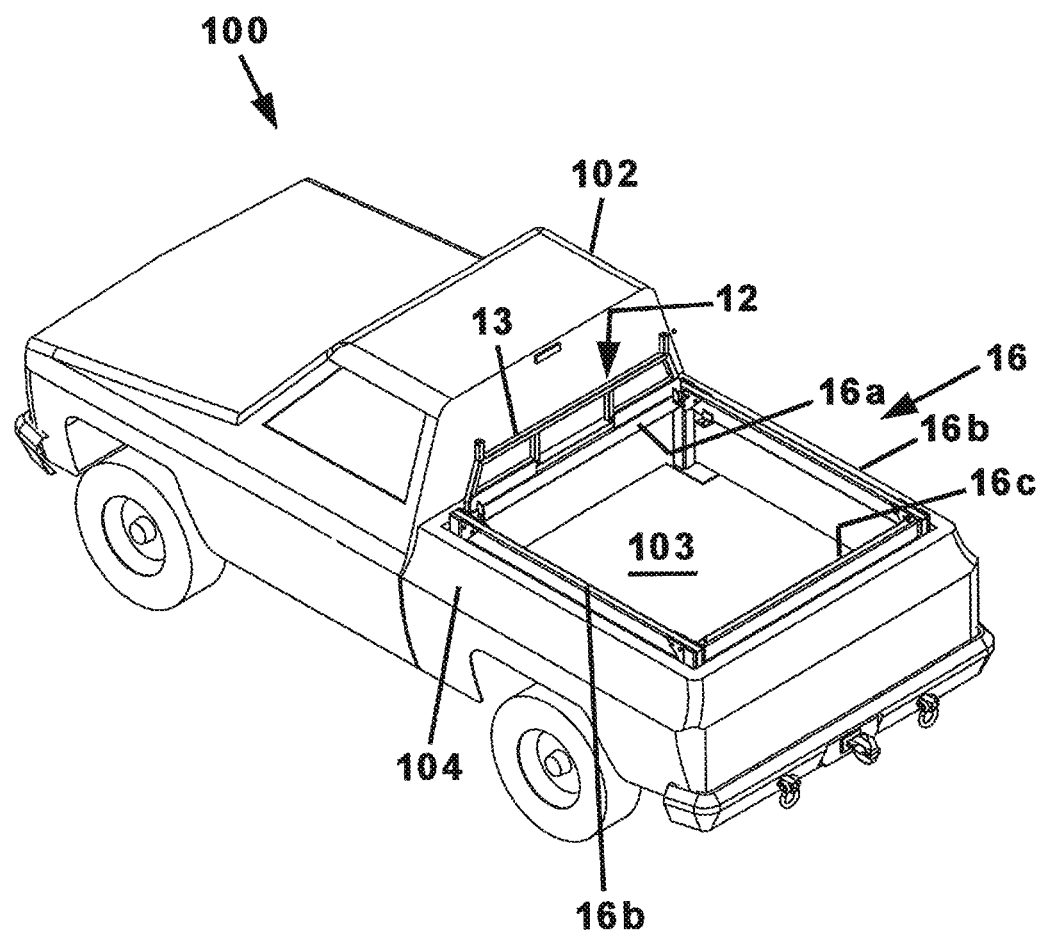
FIG. 1a is a perspective view of a retractable storage rack installed on a pickup truck bed according to a preferred embodiment of the present invention, illustrated in a retracted configuration.
Figure 1B:
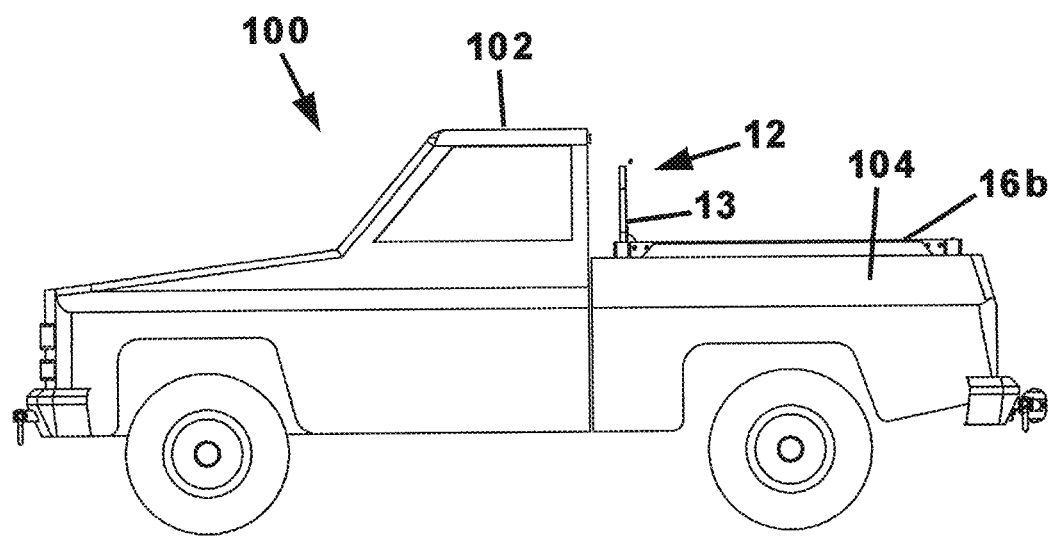
Figure 2A:
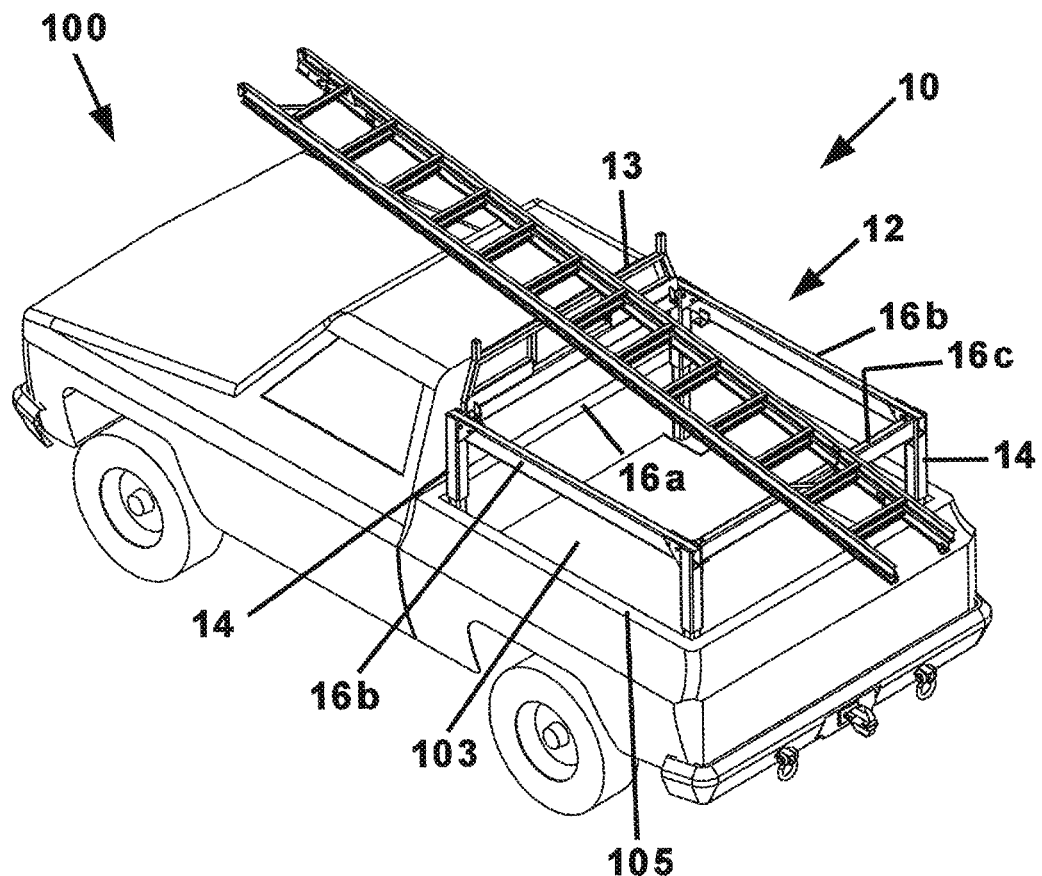
FIG. 2a is a perspective view of the retractable storage rack according to the present invention, illustrated in a deployed configuration and shown in use cargo.
Figure 2B:
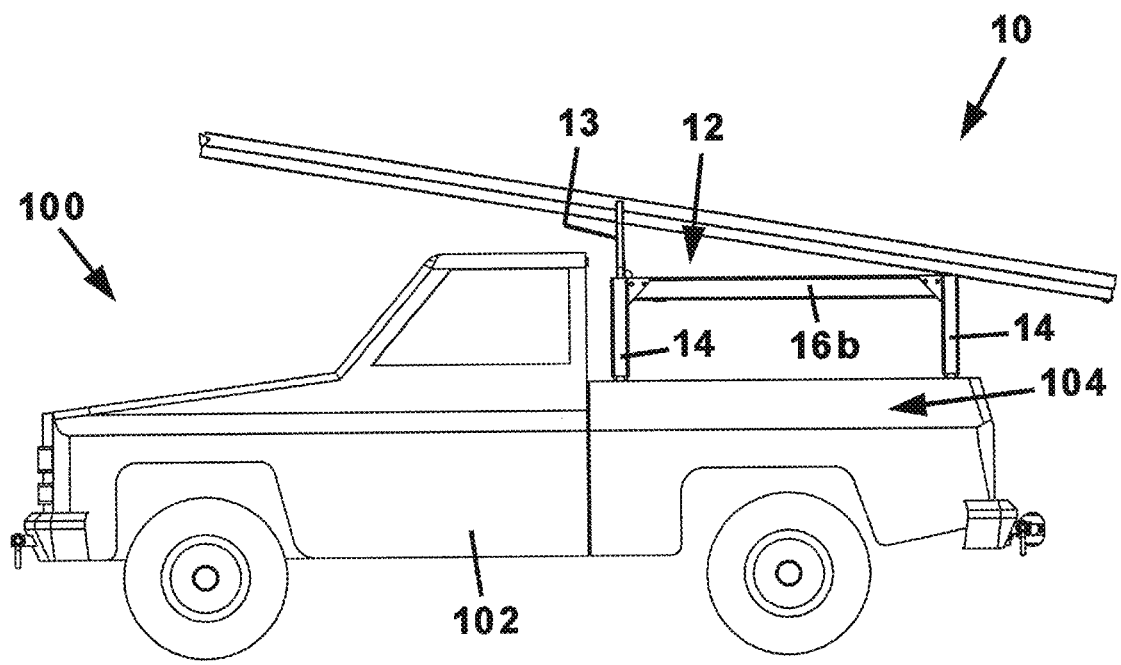
Figure 3:
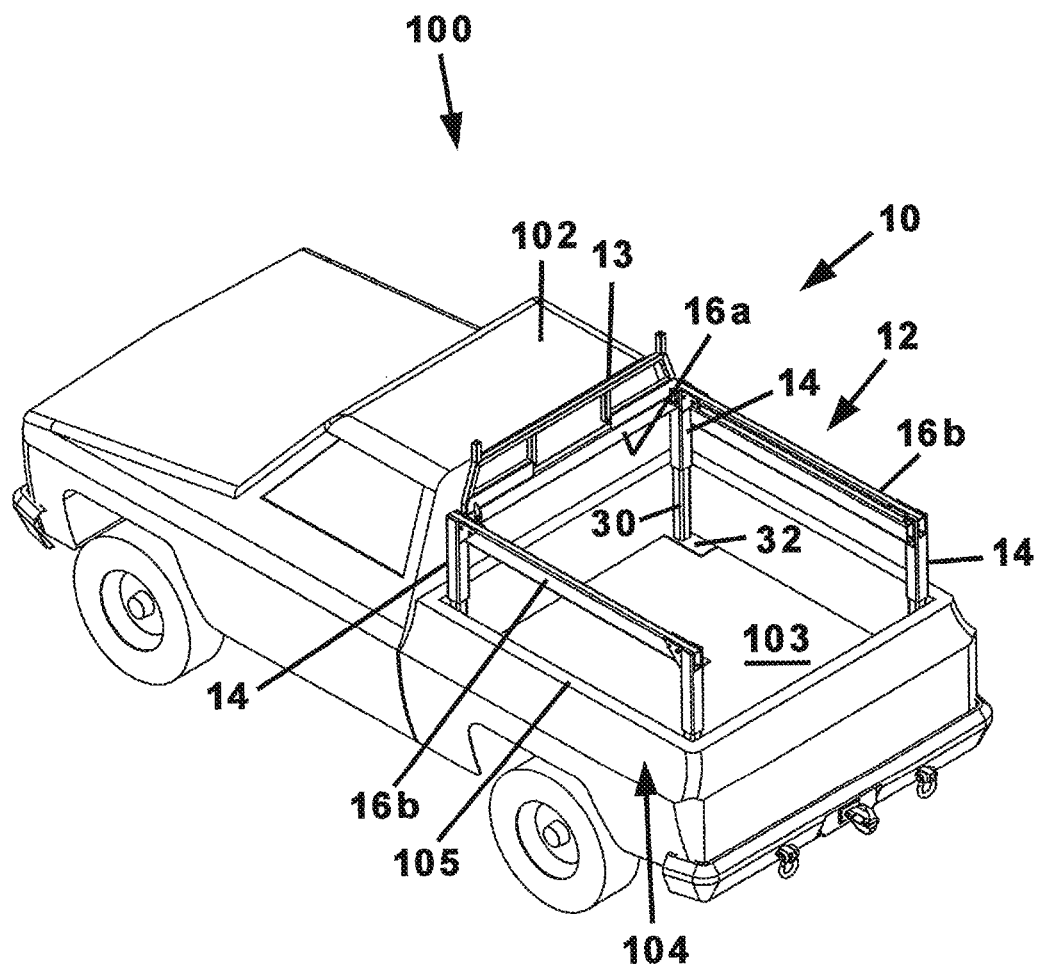
FIG. 3 is another perspective view of the retractable storage rack as in FIG. 2a, illustrated with the cargo removed for the sake of clarity.
Figure 4A:
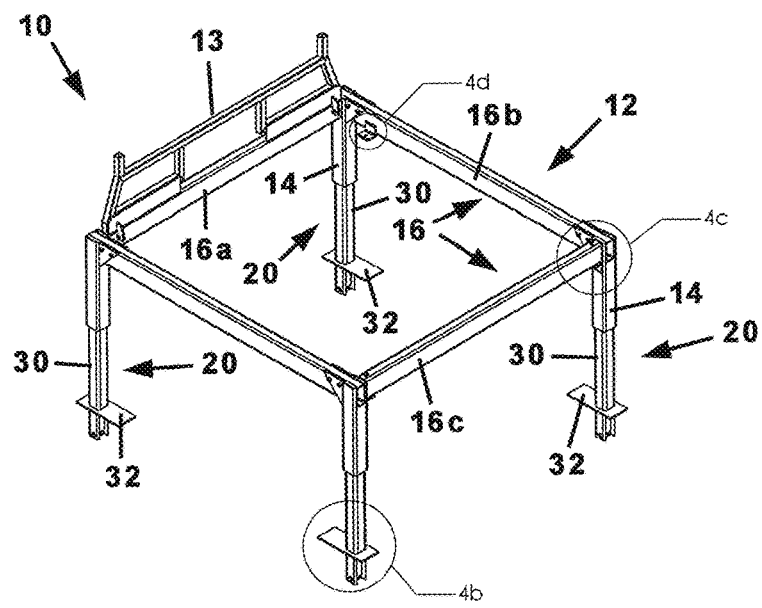
FIG. 4a is a perspective view of the retractable storage rack, illustrated removed from a pickup truck for clarity.
Figure 4B:
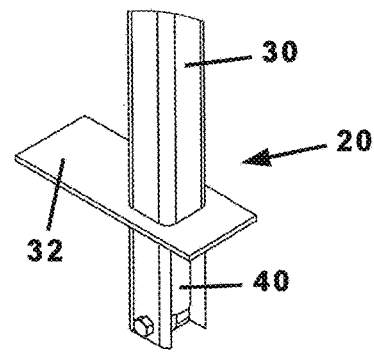
Figure 4C:
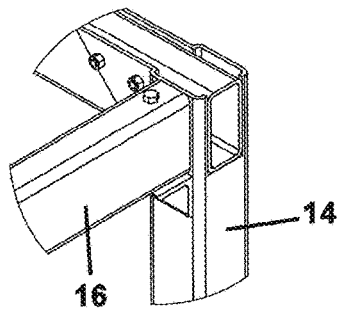
Figure 4D:
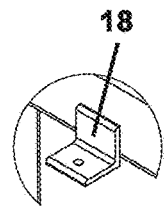
Figure 5A:
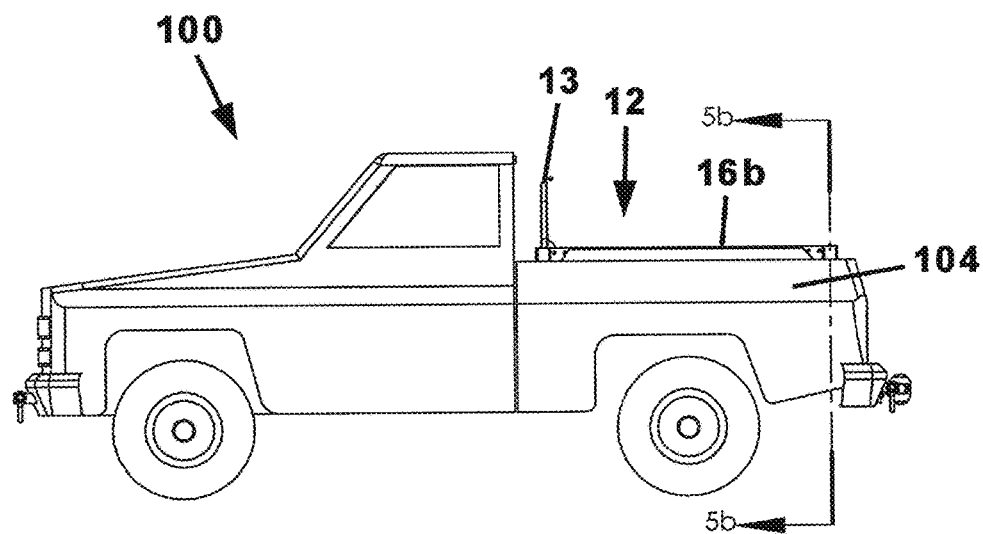
Figure 5B:
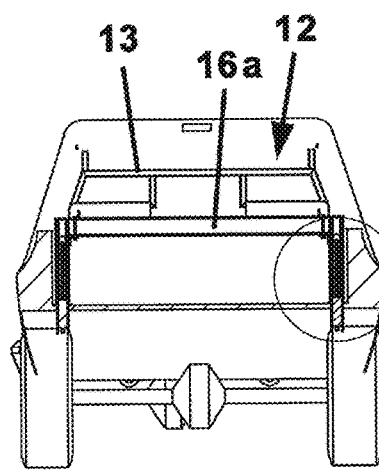
Figure 5C:
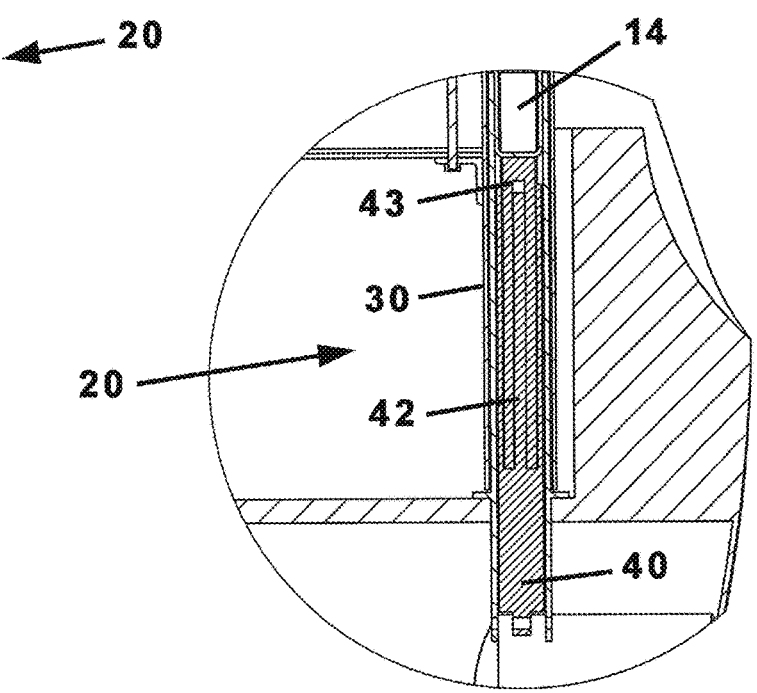
FIG. 5c is an isolated view on an enlarged scale taken from FIG. 5b.
Figure 6A:
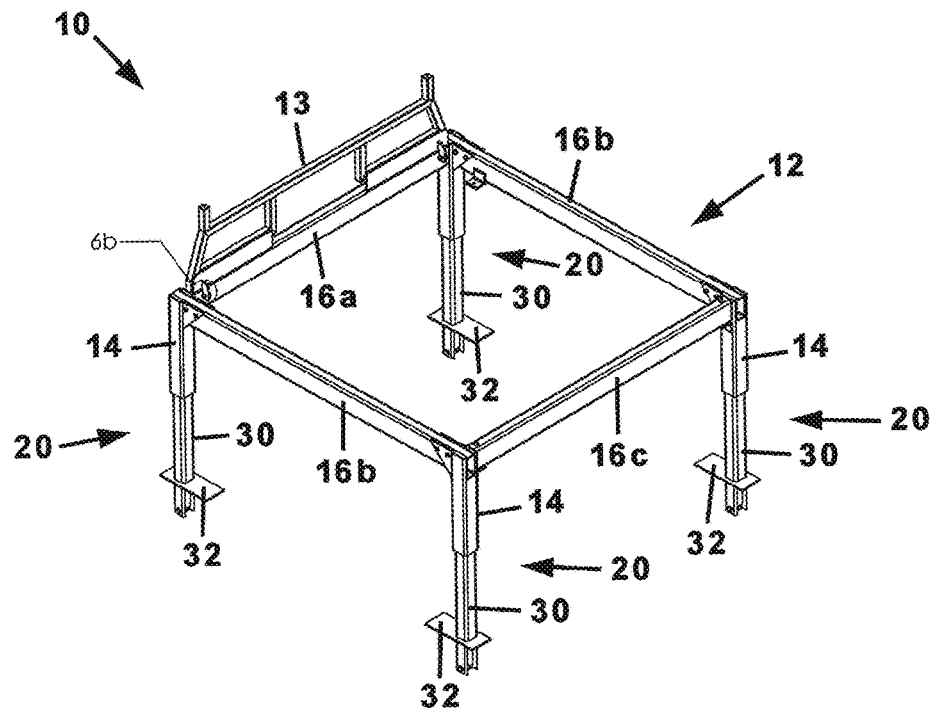
FIG. 6a is a perspective view of the retractable storage rack as in FIG. 4a, illustrated showing a front support rack section in a raised configuration.
Figure 6B:
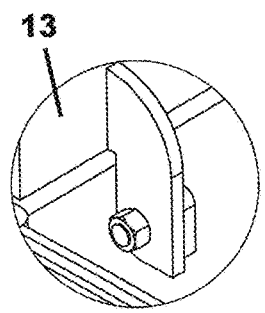
Figure 6C:
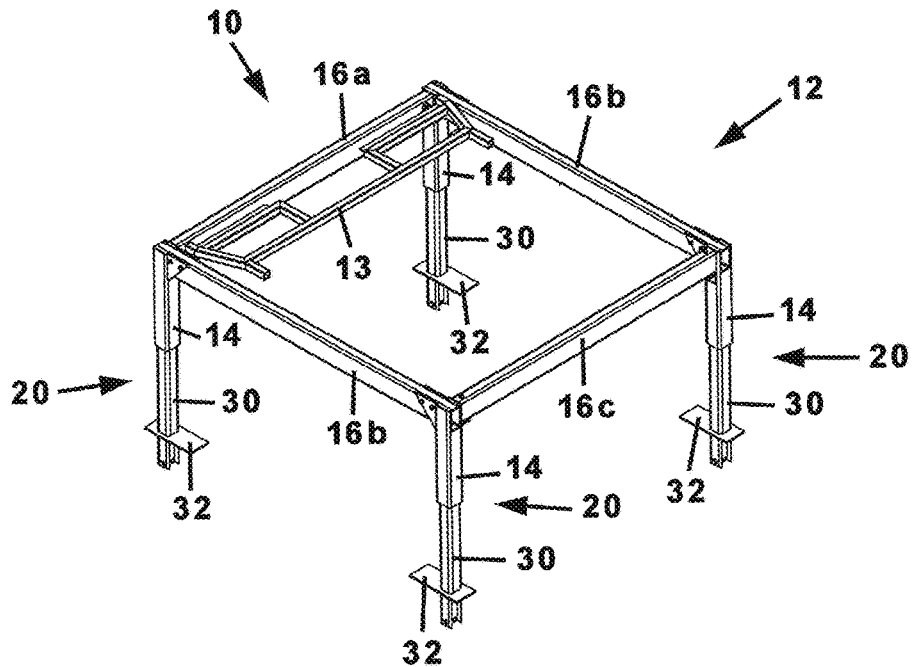
FIG. 6c is another perspective view of the storage rack as in FIG. 6a, illustrated to show the front support rack section in a lowered configuration.

A height-adjustable storage rack for a pickup truck bed according to a preferred embodiment of the present invention will now be described with reference to the accompanying drawings. The storage rack apparatus 10 includes a rack framework 12 and a plurality of lifting assemblies 20.

The height-adjustable storage rack apparatus 10 is installed on or used with a pickup truck 100 of a type having a cab portion 102 (for a driver) and a bed portion 104 suitable for hauling a payload of equipment or materials, the bed portion 104 having a floor 103 (bottom wall), and a pair of upstanding sidewalls 105 extending upwardly from peripheral edges of the floor 103. It is understood that an upper edge of each sidewall 105 may be referred to as a top rail and will also be denoted with reference number 105. Preferably, the pair of sidewalls 105 each define a vertical plane and are parallel and laterally spaced apart from one another. These structures of a traditional bed portion 104 of a pickup truck will be substantially unchanged by the present invention but are given as context and providing critical structural attachment points for the invention described and recited below. In other words, a truck bed is not claimed as the invention although it provides support for the recited invention as will become clear in the following discussions.

The rack framework 12 is the part of the invention that is configured to support and secure cargo such as boards, ladders, or other objects. Preferably, the rack framework 12 may include a plurality of upstanding post members 14 that may be interconnected by a plurality of support members 16. For the sake of clarity, the support members 16 may be referred to individually as including a front support member 16a, side support members 16b, and a rear support member 16c. In other words, the plurality of support members 16 may each have a linear and elongate configuration extending between respective front and rear post members 14, the plurality of support members 16 defining an imaginary horizontal plane. It is understood, of course, that the rack framework 12 may include additional or other configurations that may be advantageous for storing or transporting other types of objects.

For instance, the rack framework 12 may include a front rack section 13 extending upwardly from and interconnecting front post members 14. In an embodiment, the front rack section 13 may be pivotally movable between a closed or lowered configuration essentially laying atop front ends of support members 16 and an upward or raised configuration generally perpendicular to the front ends of the support members 16, respectively. Preferably, the front rack section 13 may be pivotally coupled to the front support member 16a of the rack framework 12 with pins although use of hinge fasteners may also work. When positioned in the upward or raised configuration, the front rack section 13 is positioned to substantially cover the rear window of the pickup truck 100.

The height-adjustable storage rack apparatus 10 may include a plurality of lifting assemblies 20 operably connected to the plurality of post members 14, respectively, so as to raise or lower the rack framework 12 when electrically actuated as will be described in more detail later. In an embodiment, the rack framework 12 may include a support bracket 18 that provides a gentle interface between the rack framework 12 and upper sidewalls (rails) 105 of the truck.

The bed portion 104 of a pickup truck 100 defines four interior corners inside of respective sidewalls 105, tailgate, and forward wall, respectively. Preferably, the height-adjustable storage rack apparatus 10 includes four upstanding lifting assemblies 20 with a respective lifting assembly 20 being positioned in each corner. More particularly, each lifting assembly 20 includes a lower support leg 30 (which may also be referred to as a base member, a post, a stanchion, or the like). It will be understood that each lower support leg 30 may be mounted to the floor 103 of the truck bed portion 104, each lower support leg 30 having a fixed size and being unmovable. More particularly, a base plate 32 may be coupled to the floor 103 of the bed portion 104 such as with bolts, screws, rivets or the like and the lower support leg 30 may be coupled to the base plate 32 and extends upwardly therefrom. Preferably, each lower support leg 30 extends upwardly and vertically from the floor 103, is constructed of iron, steel, aluminum, or other durable material. Further, each lower support leg 30 may be constructed using a square or cylindrical stock tubing that defines a hollow interior area.

In a critical aspect, each lifting assembly 20 includes a linear actuator or equivalent piston/cylinder combination that is configured to raise or lower the rack framework 12 as described below. In other words, combinations of the following components may operably function as a linear actuator. For instance, each lifting assembly 20 includes an actuator having an actuator motor 40 and an extension rod 42 electrically connected to the actuator motor 40 movement between a retracted configuration and an extended configuration when the actuator motor 40 is electrically energized. More particularly, the actuator motor 40 may be fixedly mounted to a frame member of the pickup truck 100 and mounted beneath the floor of the bed portion 104 In other words, the actuator motor 40 is fixedly mounted beneath the base plate 32 and is unmovable. By contrast, each actuator includes a corresponding extension rod 42 having an upper end 43 configured to extend upwardly through the hollow interior space defined by a respective support leg 30. In an embodiment, a respective extension rod 42 may be coupled to a support post that is then movable along with the respective extension rod 42. It is understood that one of ordinary skill in the art may understand the actuator and extension rod to be referred to as a piston/cylinder combination, the extension rod 42 being referred to as a piston.

In use, the rack framework 12 can be raised when the actuator motor 40 is energized, such as when the operator desires the rack framework 12 to be positioned somewhere above the sidewalls 105 as shown in the accompanying illustrations (also referred to as side rails) of the pickup truck 100, such as for hauling cargo such as ladders, lumber, or the like. It is understood, of course, that the actuator may be electrically connected to a control interface which may include input buttons, switches, or even a touchscreen or a graphical user interface such that an operator may more conveniently energize the actuator. Similarly, then, an operator may energize the actuator motor 40 to lower or retract the extension rod 42 in the manner described above and this action may correspond when the operator no longer desires the rack framework 12 to be used for cargo hauling or storage. Retraction of the extension rod 42 causes the rack framework 12 to move downwardly below the sidewalls 105.

It is understood that while certain forms of this invention have been illustrated and described, it is not limited thereto except insofar as such limitations are included in the following claims and allowable functional equivalents thereof.

The invention claimed is:

1. A height-adjustable storage rack apparatus configured for mounting in a bed portion of a pickup truck, the bed portion having a floor, opposing sidewalls, a forward wall, and a tailgate, the apparatus comprising:
   four lifting assemblies, each lifting assembly positioned at a respective corner of the bed portion;

each lifting assembly including:
    a lower support leg fixedly mounted to the floor of the bed portion and extending upwardly therefrom and defining a hollow interior;
    an actuator motor fixedly mounted beneath the floor of the bed portion; and
    an extension rod electrically connected to the actuator motor and that is movable when energized by said actuator motor between a retracted configuration and an extended configuration that extends upwardly through the hollow interior of a respective support leg; and
  a rack framework operatively coupled to upper ends of the extension rods such that energizing the actuator motors extends or retracts respective extension rods to raise or lower the rack framework relative to the bed portion;
wherein the rack framework includes:
  a plurality of upstanding post members each being situated at the respective corners of the bed portion;
  a plurality of support members interconnecting the plurality of post members that, together, form an imaginary horizontal plane, said plurality of support members including (1) a front support member, (2) a pair of side support members that are situated opposite and parallel to one another and aligned with the opposing sidewalls of the bed portion, and (3) a rear support member that is opposite to and parallel with the front support member;
  a front rack section pivotally coupled to the front support member and extending upwardly from the front support member, the front rack section being pivotally movable between a lowered configuration laying in a horizontal orientation atop front ends of the pair of side support members, and a raised configuration standing upwardly in an orientation that is generally perpendicular to the pair of side support members.

2. The apparatus of claim 1, wherein the actuator motor and a respective extension rod, together, comprise a linear actuator or piston/cylinder combination.

3. The apparatus of claim 1 wherein:
  the rack framework is configured to raise above the sidewalls of the pickup truck when the extension rods, together, are energized to respective extended configurations;
  each actuator motor is configured to retract a respective extension rod to lower the rack framework below the upper edges of the sidewalls.

\* \* \* \* \*